United States Patent [19]

Fletcher

[11] Patent Number: 4,603,422

[45] Date of Patent: Jul. 29, 1986

[54] LONG-LIVED LASER DYE

[75] Inventor: Aaron N. Fletcher, Ridgecrest, Calif.

[73] Assignee: The United States of America as represented by the Secretary of the Navy, Washington, D.C.

[21] Appl. No.: 654,355

[22] Filed: Sep. 26, 1984

[51] Int. Cl.$^4$ .............................................. H01S 3/20
[52] U.S. Cl. ................... 372/53; 252/301.16; 252/301.17; 372/54; 546/275
[58] Field of Search ............ 372/53; 260/296 R, 296, 260/307 R; 252/301.16, 301.17

[56] References Cited

U.S. PATENT DOCUMENTS

| | | | |
|---|---|---|---|
| 2,929,819 | 3/1960 | Erlenmeyer | 260/296 |
| 3,896,141 | 7/1975 | Keck et al. | 260/307 FA |
| 3,976,655 | 8/1976 | Hammond | 260/296 R |
| 3,976,656 | 8/1976 | Hammond | 260/307 R |
| 4,175,195 | 11/1979 | Beschke et al. | 546/250 |
| 4,479,223 | 10/1984 | Fletcher | 372/54 |

OTHER PUBLICATIONS

Fletcher et al., "Fluorescence and Lasing Charact. of Some Long-Lived Flashlamp-Pumpable, Oxazole Dyes"; Opt. Comm., 48(5), p. 352, (1984).

*Primary Examiner*—Leon Scott, Jr.
*Attorney, Agent, or Firm*—R. F. Beers; W. T. Skeer

[57] ABSTRACT

A method of obtaining a long-lived flashpumped laser dye with an output equivalent to commercial dyes and a low threshold of lasing using the N-methyl tosylate salt of 2-(4-pyridyl)-5-(4-methoxyphenyl) oxazole.

3 Claims, No Drawings

LONG-LIVED LASER DYE

BACKGROUND OF THE INVENTION

1. Field of the Invention

This invention relates to the field of chemistry. More particularly, this invention relates to dye lasers. Still more particularly, but without limitation thereto, this invention relates to a method of obtaining a long-lived flashpumped laser dye with an output equivalent to commercial dyes and with a low threshold of lasing.

2. Description of the Prior Art

The class and wavelength of laser dyes of interest are in the range of 560 to 585 nm. More specifically, the desirable lasing wavelength is 560. This particular wavelength region has rhodamine dyes (strongest output) that lase, yet they have lower lifetimes. Other dyes in this region include brilliant sulfaflavine, fluoral 555 (both with low outputs) and shifted coumarin dyes.

Research has been done with oxazoles yet they have shown little success as flashlamp-pumpable laser dyes. Considerable improvement was shown when molecular engineering was performed on the oxazoles to make them more absorptive and to attach triplet-state quenchers to them. However, the lasing outputs of the modified oxazoles were still low compared to other classes of dyes.

Salts of a pyridyl substituted phenyloxazole in water have exhibited relatively low laser outputs and moderate durations of lasing with flashlamp pumping. The effects of dye structure, cover gas and solvent are all critical to laser output and lifetime. This invention establishes that under very specific experimental conditions, one of the oxazole dye modifications yields the highest lifetime with moderate laser output of any laser dye solution reported. See A. N. Fletcher, R. A. Henry, R. F. Kubin and R. A. Hollins, *Fluorescence and Lasing Characteristics of Some Long-Lived Flashlamp-Pumpable, Oxazole Dyes*, Optics Com. 48, pp. 352-356 (1984).

SUMMARY OF THE INVENTION

An object of the present invention is to provide a method for obtaining a long-lived moderate output laser dye.

A further object of the present invention is to provide a method of obtaining in a flashlamp pumped laser system, a long-lived flashpumped laser dye having a low threshold of lasing and a moderate output.

These and other objects have been demonstrated by the present invention wherein the dye solution comprised of an oxazole laser dye and a solvent are placed in a laser dye cavity, screened from ultraviolet light by a glass filter, and then flushed with an inert gas. The dye solution is then pumped with a flashlamp to produce laser emission.

DESCRIPTION OF THE PREFERRED EMBODIMENT

The test setup uses a triaxial flashlamp having a 300 nm cutoff ultraviolet filter to contain the lasing solution (laser cavity) separating it from the water coolant. The rise time of the triaxial flashlamp used is 200 ns. The output mirror has a nominal 55% reflectivity at the lasing wavelength.

Additionally, a wavelength and intensity corrected linear flashlamp for dye degradation is used. The linear flashlamp is water cooled and operates at 10 J (electrical) input. A portion of this setup is made of optical glass to serve as a wavelength filter. In developmental models of the invention, this filter was made of a glass known as "Pyrex" a trade name of the Corning Glass Works of Corning, New York. The glass of other manufacturers may be substituted as dictated by good engineering practice.

The concentrations of the solutions used for flashlamp testing are selected so as to have an absorbance of 4 to 5 cm$^{-1}$ in the $S_0 \rightarrow S_1$ absorption band.

Laser outputs $\Phi$, for a specific electrical input energy to the flashlamp I, are computer fitted to the relationship derived in Fletcher et al., Applied Physics B29, p. 139 (1977), $$\Phi = a + bI/(1+cT)$$

where T is the total input energy $\Sigma I$, per unit volume. The initial lasing slope efficiency $k_o$, is taken as equivalent to b, while the initial lasing threshold $t_o$, is taken as equivalent to $-a/k_o$. The lifetime constants should be taken as relative measurements since there has not yet been any demonstrated capability to transfer such constants between different laser configurations.

Several modifications of oxazole dyes were studied. The dye modification showing the greatest improvement is the attachment of a methoxy to a phenyl group to yield the N-methyl tosylate salt of 2-(4-pyridyl)-5-(4-methoxyphenyl)oxazole (hereinafter 4PyMPO-MePTS) having the following structure:

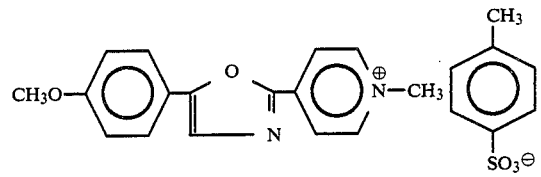

This group causes a very marked red-shift in fluorescence and lasing wavelengths. The fluorescence characteristics of 4PyMPO-MePTS are shown in Table 1.

TABLE 1

| | Fluorescence Measurements of 4PyMPO-MePTS | | |
|---|---|---|---|
| | Emission | Fluorescence quantum yield under | | |
| Solvent | peak, nm | Argon | Air | Oxygen |
| ethanol | 567 | 0.76 | 0.73 | 0.65 |
| water | 578 | 0.35 | 0.38 | 0.37 |

It is surprising that 4PyMPO-MePTS can be made to lase at all in water since it has a fluorescence quantum yield of only 0.38. The results of attempts to lase 4PyMPO-MePTS under air in ethanol show a very high threshold even though oxygen shows little effect upon the fluorescence. Thus, attempts to lase this dye in water or ethanol under air using flashlamp pumping would suggest a very poor dye.

However, when dissolved in ethanol under argon, 4PyMPO-MePTS is the longest-lived, moderate output dye of the laser dyes studied. Several tests were done with 4PyMPO-MePTS in various solvents and the results are presented in Table 2.

TABLE 2

Flashlamp-Pumped Lasing Characteristics of 4PyMPO-MePTS

| Concentration, molar | Solvent | Cover Gas | Slope Efficiency, $k_o \times 10^3$ | Threshold, $t_o$, J | Lasing Lifetime constant, $1/c$, MJdm$^{-3}$ | Wavelength, nm |
|---|---|---|---|---|---|---|
| $2 \times 10^{-4}$ | ethanol | air | n.d.[1] | −50.0 | n.d. | n.d. |
| $1 \times 10^{-4}$ | ethanol | argon | 1.6 | 21.0 | 2,000.0 | 560-583 |
| $2 \times 10^{-4}$ | ethanol | argon | 1.5 | 22.0 | >10,000.0 | 567-587 |
| $1 \times 10^{-4}$ | 2-propanol | air | n.d. | −45.0 | n.d. | n.d. |
| $1 \times 10^{-4}$ | 2-propanol | argon | 1.4 | 16.9 | 16.0 | 559-582 |
| $2 \times 10^{-4}$ | methanol | argon | 1.0 | 25.6 | >10,000.0 | 571-588 |
| $2 \times 10^{-4}$ | water | argon | 0.45 | 41.0 | n.d. | 571-591 |

[1]not determined

Only at $1 \times 10^{-4}$ molar was a lifetime measured for the dye in ethanol. Going to $2 \times 10^{-4}$M and using 600 ml of solution, the lasing output slightly increases after 50 hours of testing a continuous electrical input of 250 W. Thus the dye was too stable to be able to determine its lifetime constant within 50 hours.

A similar high lifetime is observed using methanol under argon but with reduced laser output. In 2-propanol, however, the lifetime of 4PyMPO-MePTS is only moderately good. Again, oxygen causes a marked quenching of the lasing output in both of these last two solvents.

This invention has been described in detail with particular reference to certain preferred embodiments thereof, but it will be understood that variations and modifications can be effected within the spirit and scope of the invention.

What is claimed is:

1. A method of obtaining in a flashlamp pumped laser system, a long-lived flashpumped laser dye having a low threshold of lasing and a moderate output comprising the steps of:

placing a dye solution comprising a laser dye, the N-methyl tosylate salt of 2-(4-pyridyl)-5-(4-methoxyphenyl)oxazole, having the structure:

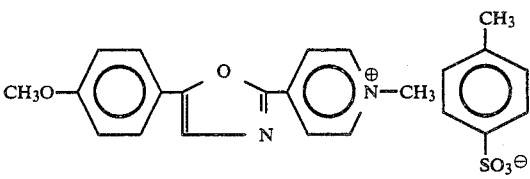

and a solvent into a laser dye cavity;
   screening said dye solution from ultraviolet light with an optical filter;
   flushing said dye solution with an inert gas; and
   optically pumping said dye solution with a flashlamp to produce laser emission.

2. The method of claim 1 wherein said solvent is selected from the group consisting of ethanol and methanol.

3. The method of claim 1 wherein said inert gas is argon.